May 9, 1967     E. L. BRYAN     3,318,725
METHOD OF IMPREGNATION OF POROUS MATERIALS, APPARATUS
THEREFOR, AND PRODUCT THEREOF
Filed March 9, 1965     3 Sheets-Sheet 1
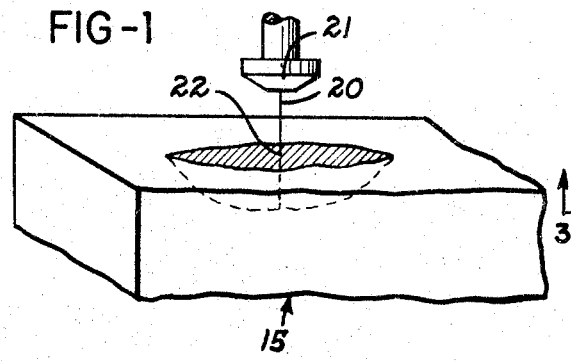
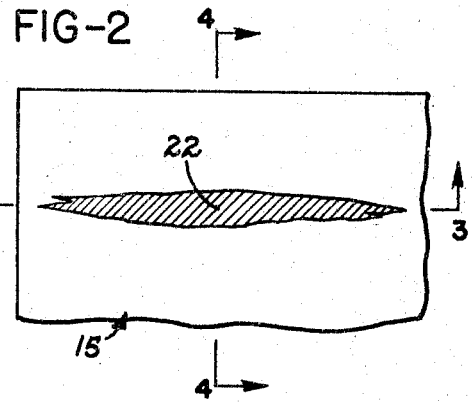
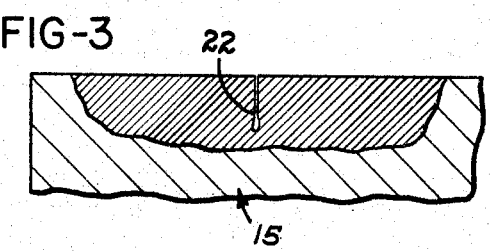
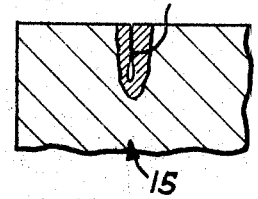
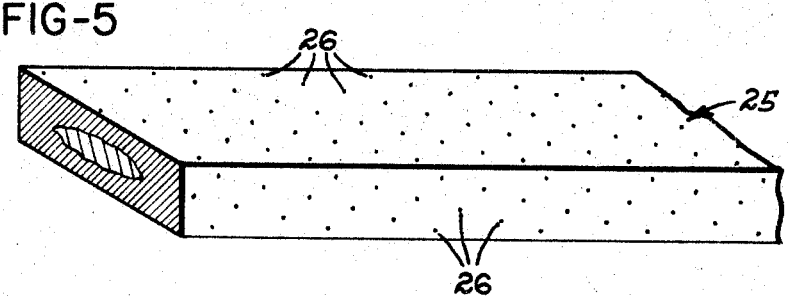
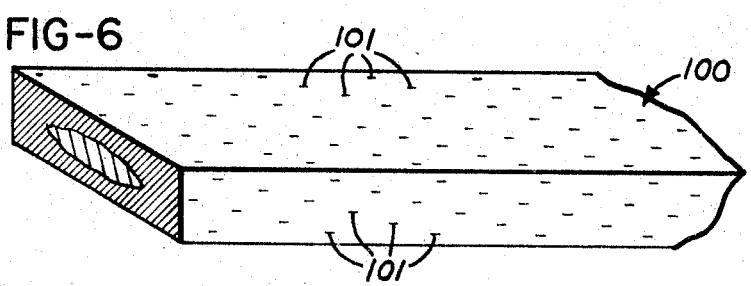
INVENTOR.
EUGENE L. BRYAN
BY
Marechal, Biebel, French & Bugg
ATTORNEYS

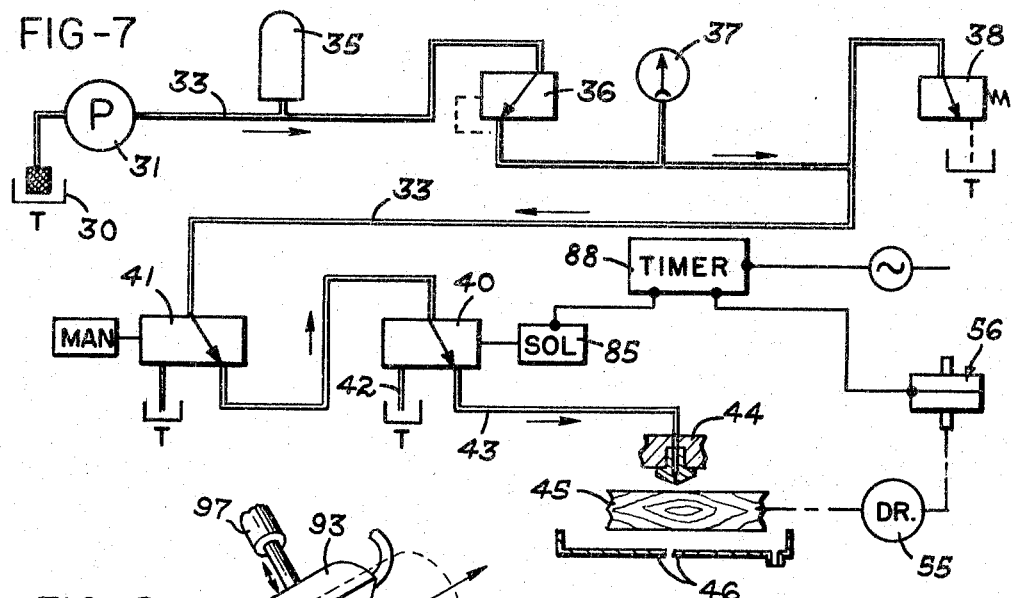
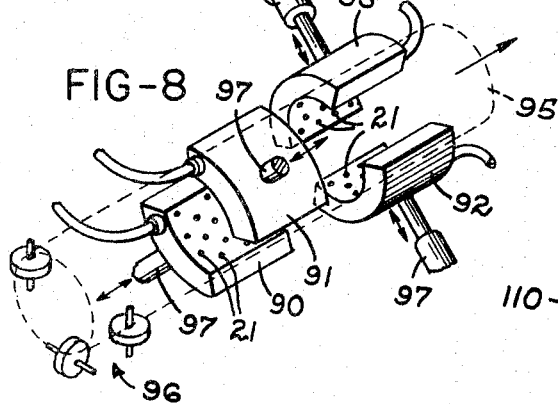
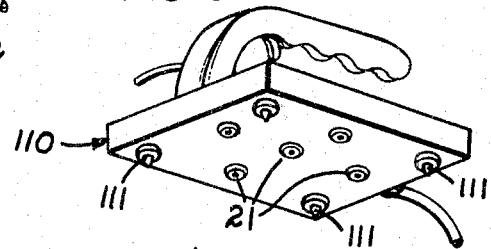
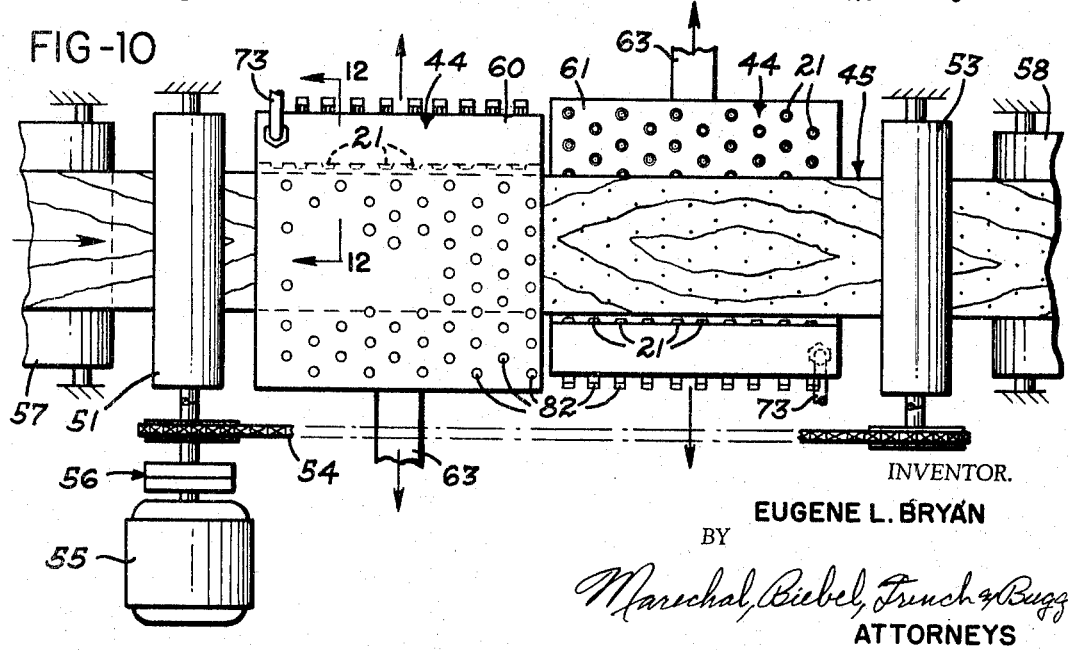

May 9, 1967
E. L. BRYAN
3,318,725
METHOD OF IMPREGNATION OF POROUS MATERIALS, APPARATUS
THEREFOR, AND PRODUCT THEREOF
Filed March 9, 1965
3 Sheets-Sheet 3
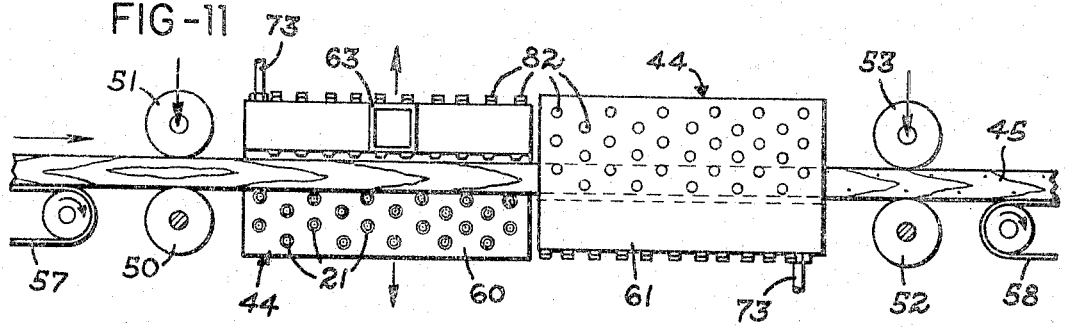
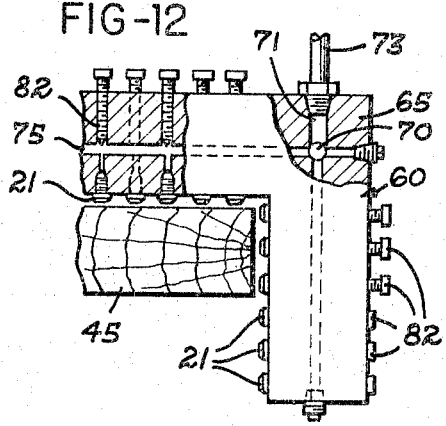
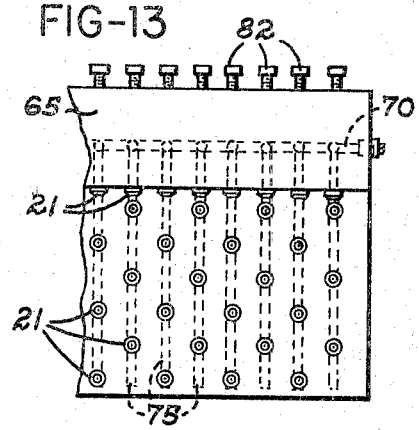
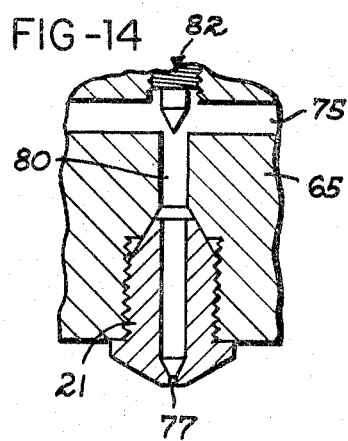
INVENTOR.
EUGENE L. BRYAN
BY
*Marechal, Biebel, French & Bugg*
ATTORNEYS

United States Patent Office 3,318,725
Patented May 9, 1967

3,318,725
METHOD OF IMPREGNATION OF POROUS MATERIALS, APPARATUS THEREFOR, AND PRODUCT THEREOF
Eugene L. Bryan, Everett, Wash., assignor to The Black Clawson Company, Hamilton, Ohio, a corporation of Ohio
Filed Mar. 9, 1965, Ser. No. 438,353
17 Claims. (Cl. 117—104)

This invention relates to the impregnation of wood and other porous materials with treating agents of various types for correspondingly varied purposes, and it relates more particularly to novel methods and apparatus for carrying out such impregnation treatments and to novel products resulting therefrom.

The invention has been developed primarily in connection with the treatment of wood, and much of the description herein will accordingly be in connection with wood products, but it is also applicable to the treatment of other porous materials, such particularly as composition board of cellulosic origin and similar materials used for construction or finishing purposes of many kinds. Similarly, the treating agents with which the invention is usable may have a variety of purposes, including resistance to fire, decay, termites and other destructive agents or forces, and also decoration or other finish coat purposes.

The advantages of the invention as applied to the treatment of wood products are most readily appreciated when it is compared with conventional methods and apparatus for the impregnation treatment of wood with agents for resistance to fire, decay and other destructive forces. They commonly involve the use of pressure vessels operating on a batch basis, and they require extended periods of time for each batch, namely as much as twelve hours or more per batch, in order to effect retention of the necessary volume of treating agent. In addition, it is a common practice to subject the wood to a mechanical incising treatment before impregnation, in order to provide openings in the surface of the wood for penetration by the treating agent.

These conventional methods and apparatus and their operating conditions impose severe limitations on the practicability of impregnation treatments, in terms of the materials to which they are applied. For example, the length of a given workpiece which can be treated is limited by the size of the available retort or cylinder where the treatment is to be carried out. Similarly, the cost of the equipment, and especially the time required for treatment of each batch, adds substantially to the cost of the end products. As a result, impregnation treatments for the purposes of preservation have been largely limited to the field typified by railroad ties, marine piles, power poles and bridge timbers, and they have had only insignificant use for the treatment of dimension lumber and other wood products for fabricating and/or finishing purposes in the construction of homes and other buildings.

It is a primary object of the present invention to provide a novel method for the impregnation of wood and other porous materials which offers outstanding advantages over past practices in terms of equipment and operating cost, and which also is essentially free of the limitations of past practice with respect to the nature and dimensions of the workpieces to be treated.

Another primary object of the invention is the provision of a method as outlined above which will result in impregnated products of novel characteristics having numerous outstanding advantages over the products of the past practice, including materially reduced production cost, more effective impregnation, and improved appearance especially from the standpoint of freedom from physical defects resulting from causes such as the mechanical incising techniques of conventional practice.

A further primary object of the invention is the provision of novel apparatus for carrying out the method of the invention in the production of the novel products of the invention.

It is a more specific object of the invention to produce improved impregnated products as outlined above by an impregnation treatment wherein a solution of the treating agent is applied to the surface of each workpiece in the form of multiple high pressure jets arranged to impinge on the surface of the workpieces at such spaced locations that impregnation is effected over the entire desired area and volume of the workpiece.

A further object of the invention is the provision of apparatus and methods as outlined above which are not limited to practice with the usual types of preservative agents for wood but which are useful, for example, for impregnating the surface portion of a workpiece with a preliminary finishing agent such as a priming coat for a finish coat of paint or the like, and a still further specific object of the invention is the provision of pieces of wood and similar materials suitable for use for finishing purposes in a home or other building and having the surface portion thereof impregnated with the priming agent for the paint or other finish coat.

Additional objects and advantages of the invention will be apparent from the following description, the accompanying drawings and the appended claims.

In the drawings—

FIG. 1 is a diagrammatic view in perspective illustrating the operation of the method of the invention in conjunction with a fragment of a wood workpiece;

FIG. 2 is a diagrammatic plan view of the workpiece fragment following treatment by the method of the invention;

FIG. 3 is a diagrammatic section on the line 3—3 of FIG. 2;

FIG. 4 is a diagrammatic section on the line 4—4 of FIG. 2;

FIG. 5 is a diagrammatic perspective view of a piece of dimension lumber constituting one form of product of the invention;

FIG. 6 is a view similar to FIG. 5 showing another form of product of the invention;

FIG. 7 is a diagrammatic view of apparatus in accordance with the invention for carrying out the method of the invention;

FIG. 8 is a diagrammatic fragmentary view illustrating a modified form of the apparatus of the invention for use in the treatment of generally cylindrical workpieces;

FIG. 9 is a somewhat diagrammatic view showing a nozzle manifold for use in portable apparatus for carrying out its method of the invention;

FIG. 10 is a plan view in greater detail than FIG. 7 of a portion of apparatus in accordance with the invention for treating workpieces of rectangular section;

FIG. 11 is a side view of the apparatus of FIG. 10;

FIG. 12 is a fragmentary section on the line 12—12 of FIG. 10;

FIG. 13 is a fragmentary view partly broken away, looking from left to right in FIG. 12; and FIG. 14 is an enlarged fragment of FIG. 12.

Referring to the drawings, which illustrate preferred embodiments of the invention, FIGS. 1–4 illustrate diagrammatically some of the principles of the invention as exemplified by a fragment of a wood workpiece 15 undergoing treatment in accordance with the method of invention. More specifically, the fragmentary workpiece 15 is shown as being subjected to a high pressure jet 20 of minute cross section comprising a solution of a treating agent discharged from a nozzle 21. The impingement of this jet results in the development of a similarly dimensioned hole 22 of essentially circular cross section and minute diameter, for example .005 inch, but of very much greater depth such as the order of .5 to 1.5 inch or more.

In the practice of the invention, the application of the jet 20 to the workpiece 15 is carried out for a substantial time interval of the order of .5 to 1.0 second, although the major portion of the depth of the hole 22 is developed substantially instantaneously. In addition, this jet is propagated under high pressure, in the range of 10,000–50,000 p.s.i., causing the solution to be forced into the cellular structure of the workpiece 15 generally radially of the hole 20 and also into the portions of the workpiece surrounding the bottom end of the hole 22.

The shading of the workpiece 15 in FIGS. 2–4 illustrates the diffusion of the treating agent into the wood which typifies the results of the method of the invention as summarized in the preceding paragraph. As shown in FIGS. 2 and 3, the extent of the diffusion parallel with the grain of the workpiece is quite substantial, and tests have established that such diffusion over areas averaging 8 inches in length can readily be obtained in woods such as Southern Pine and Douglas fir. The extent of the diffusion of the treating agent perpendicularly to the grain of the wood is substantially less, as indicated in FIGS. 2 and 4, the average values obtained in the same tests being of the order of 1 inch and the total diffusion below the treated surface of the wood was of the order of 1 inch.

Having in mind the extent of the diffusion of the treating agent which can be obtained with a single high pressure jet as just described, the invention provides for effectively complete impregnation of the surface areas of a workpiece of porous material by jet treatment at such multiple predeterminedly spaced locations that the diffusion patterns around the respective holes overlap sufficiently in the direction parallel with each treated surface to provide adequate impregnation of the entire surface portion. FIG. 5 shows a fragment of a piece 25 of dimension lumber such as a 2 inch by 6 inch plank which illustrates such application of the invention under conditions providing a plurality of circular holes 26 arranged in a predetermined pattern such that the portions of the workpiece into which the treating agent is diffused from each of the holes 26 overlap sufficiently to effect impregnation of an adequately thick portion of the piece underlying each of its outer surfaces.

FIG. 7 shows diagrammatically a basic system of apparatus in accordance with the invention for carrying out the method of the invention as outlined above. The fluid supply tank 30 contains a solution of any desired treating agent for supply to a suitable pump 31, such as a positive displacement pump capable of developing the desired pressure. The delivery line 33 from the pump 31 is provided with an accumulator 35 for damping pulsations, a pressure regulator 36, a pressure gauge 37 and a safety valve 38. The supply line 33 leads to a control valve 40 through a by-pass valve 41 which may be manually or otherwise operable between positions dumping to tank and transmitting to valve 40.

The preferred practice of the invention requires that the jets be discharged intermittently, with the workpiece being moved between jet treatments. The control valve 40 should therefore be of any suitable type capable of fairly rapidly shifting between a by-pass position in which it dumps the supply solution to its discharge outlet 42 to tank, and an operating position delivering the solution through line 43 to the nozzle manifold identified generally as 44. The workpiece 45 in FIG. 7 represents the workpiece 15 or any other workpiece which is supported for movement relative to the manifold 44 as the method of the invention is carried out thereon. It will be understood that a substantial portion of the applied liquid tends to run off the workpiece, and FIG. 7 accurately shows a trough 46 or similar receptacle for receiving this liquid for return to the supply tank 30.

FIGS. 10–14 illustrate in greater detail one form of nozzle manifold 44 and one form of cooperating conveyor system for the workpiece 45, which is shown in FIGS. 10–12 as a wooden plank of substantial length. Referring particularly to FIGS. 10 and 11, the apparatus comprises two pairs of feed rolls 50–51 and 52–53 driven in synchronized relation as by means of the chain 54 and the motor 55 through a combination clutch-brake 56. A belt or other conveyor 57 shown fragmentarily in FIGS. 10 and 11 delivers successive workpieces to the feed rolls 50–51, and a similar belt conveyor 58 removes the treated workpieces from the feed rolls 52–53.

The two pairs of feed rolls in FIGS. 10 and 11 are spaced apart to provide an open space in which are mounted a pair of nozzle manifolds 60 and 61 which correspond functionally to the manifold 44 in FIG. 7 but which are of such construction and arrangement as to apply high pressure jets of treating solution to substantial areas on all four surfaces of the workpiece 45. The manifolds 60 and 61 may be of identical construction and are provided with any suitable mountings 63. As shown in more detail in FIG. 12, each manifold 60–61 comprises a right angled block 65 having a plurality of nozzles 21 mounted in both of its inner surfaces so that each manifold is capable of simultaneously treating two adjacent surfaces of the plank 45.

Referring more particularly to FIGS. 12–14, each block 65 has therein a main supply header passage 70 connected at 71 to a supply line 73 which corresponds to the supply line 43 in FIG. 7 and is to be understood as provided with a functionally similar control valve 40. A plurality of branch supply passages 75 lead through the block 65 from the main supply passage 70, and a plurality of nozzles 21 each having a jet orifice 77 are inserted through the inside surfaces of the block with their inlet ends each coinciding with a branch line 80 from one of the branch passages 75. These passages 75 are relatively closely spaced so that the nozzles 21 can be arranged as shown in alternating relation to provide a pattern of jets which can similarly be relatively closely spaced longitudinally and laterally of the workpiece.

It will now be understood on the basis of the previous explanation that the pattern of nozzles in each manifold should be such that the corresponding pattern of holes in the workpiece will be sufficiently closely spaced, with relation to the grain or porosity of the workpiece and the diffusion characteristics therein of the selected treating agent, to provide the desired overlapping arrangement of the diffusion patterns around each hole for effective impregnation of the entire corresponding portion. The nozzles 21 should therefore preferably be spaced on each block 65 to provide the most closely spaced jet pattern expected to be required.

All nozzles in each manifold may not be needed for workpieces of some materials and/or some sizes, and each nozzle 21 is therefore provided with its own shut-off valve, shown as comprising a needle-pointed screw 82 threaded into the opposite surface of the block 65 in line with its associated nozzle for movement across the associated supply passage 75 into closing relation with the branch line 80 to the inlet end of its associated nozzle 21. Thus the manifolds are preferably constructed for use with the largest practical workpieces, and when they are used as shown in FIGS. 10 and 11 with a plank having surfaces which face only a portion of the nozzles 21, the nozzles which are not required will be closed by their valve 82.

In the operation of the apparatus of FIGS. 10–11 in combination with the pressure supply system as described in connection with FIG. 7, holes of the smallest size are produced in the workpiece if the jets impinge while it is stationary with respect to the nozzle manifolds. For this purpose, the drive for the feed rolls 50–53 is controlled in timed relation with the control valve for the manifolds 60 and 61 such that the workpieces are advanced only during the intervals when the supply of treating solution to the nozzles is cut off, and the workpieces are held stationary during each interval while the nozzles are discharging their respective jets.

An example of such control arrangement is represented diagrammatically in FIG. 7 by the solenoid 85 so connected that when energized, it holds the valve 40 in its by-pass position to line 42, and by the similar showing of the clutch-brake 56 as electrically operated to its driving positions when solenoid 85 is energized, and to its braking position when the solenoid 85 is released. The relative time intervals of the injecting and feeding portions of each cycle are readily controlled automatically as indicated diagrammatically by the timer 88 in the power supply circuit to the clutch-brake 56 and solenoid 85. Many other alternative arrangements could be substituted to accomplish the same functional results within the principles of the invention.

As previously noted, the effectiveness of any impregnation treatment is commonly measured in terms of the amount of the treating solution which is retained in the treated material, and operating conditions for workpieces of any given material will depend upon the standards for retention of the particular solution to be used. By way of illustrative example, the operating conditions set forth below are based upon the treatment of 2 x 6 pieces of Southern Pine with a 20% solution of pentachlorophenol to effect thorough preservation or protection to a depth of a least ¾ inch by retention of approximately 5 pounds of the solution per cubic foot of the treated material. In this example, it is also assumed that each of the nozzle manifolds 60 and 61 measures 24 inches in the direction of travel of the work, which will require 132 active nozzles to meet the test conditions, as follows:

Nozzle orifice diameter __ 0.005 inch.
Supply pressure _____ 35,000 p.s.i.
Jet duration _____ 1 second.
Jet spacing _____ 4 inches along the grain, .75 inch across the grain.

There is nothing critical in the speed with which the work advances between injection cycles, but this speed will determine the production rate, and it appears practicable to use speeds as high as 1,200 feet per minute. A speed of this order will result in approximately 100 board feet per minute of treated 2 x 6 planks or 48,000 board feet for each eight hour shift. Since the lineal output is independent of size up to the practical limits imposed by the size of the respective manifolds, it will be apparent that the volume output will be correspondingly greater when work of greater cross section is treated.

At the conclusion of treatment as described, the treated material differs in appearance from its previous condition only to the extent of whatever change in color may result from the absorbed solution and the pattern of holes 20 in its surfaces. These holes, however, are of such minute size and even configuration, namely only .005 inch according to a preferred example of the invention, that as a practical matter, they are not even readily visible except upon close examination for the purpose of ascertaining whether or not they are present. If the workpiece is dissected by cutting apart along one of the holes 20 and then subjected to microscopic examination, it will be found that the hole is of a depth of the order of .5 inch and of essentially uniform dimensions throughout most of its length with an enlarged bottom region, which is generally teardrop in shape, with a maximum diameter 3 to 5 times greater than that of most of the hole, as indicated in FIGS. 3–4. Also, the observer will be able to see disintegrated fragments of the material which previously occupied the volume of the hole in the cells which form the wall of the hole. These characteristics, however, in no way detract from the utility of the wood, but they are of value in distinguishing the product of the invention from wood workpieces which have been impregnated by other techniques, such as pressure impregnation, with or without preliminary mechanical incising.

It will be apparent that some test work is likely to be required in connection with any new batch of work material to be impregnated in order to determine the optimum conditions of treatment, but such testing is normally required with conventional methods of impregnation, since the absorption properties of natural products cannot be predicted with complete accuracy. Thus it may be more practical to treat some materials with nozzles of different design or with a larger or smaller orifice 77 in the nozzles than the .005 inch dimension already noted. Satisfactory results have been obtained with orifice diameters in the range of .003 to .010 inch, and it appears that the limits of orifice size are primarily practical, in that as the orifice size and jet increase in diameter, the holes in the workpiece will be correspondingly larger and more likely to be readily visible.

The source pressure for the jets in the practice of the invention should be as high as is practical but not so high that rupture of the workpiece results. Tests of the practice of the invention indicate that a suitable range of pressures for relatively deep treatment of wood is from 10,000 to 50,000 p.s.i., with 35,000 p.s.i. being generally satisfactory. It also appears that the effectiveness of the method of the invention is subject to the law of diminishing returns from the standpoint of the time of propagation of each jet, and intervals in the range of 0.5–1.0 second have proved most satisfactory for wood when the jets and workpiece are relatively stationary. In general, the teardrop shape of the holes in longitudinal section becomes more marked when the jet interval is longer. In materials other than wood, the optimum time interval may be substantially greater or less, as determined by test.

The preferred spacing between the nozzles and the workpiece is in large measure determined by practical considerations, since an increase in this spacing usually results in some increase in the size of the holes formed in the workpiece. Tests indicate that if this spacing is relatively close, for example approximately ⅛ inch, the holes will be of essentially the same size as the orifice 77 of each nozzle. If this spacing is increased substantially, for example to as much as from 1 to 1.5 inch, the hole size in the workpiece may be as much as two or three times larger than the nozzle orifice, but it will be apparent that holes of this magnitude may not be undersirable in view of the fact that even three times an orifice diameter of .005 inch will be only .015 inch. Proper spacing may be achieved by the use of adjustable mountings 63 for the nozzle manifolds 60–61 in accordance with the sizes of respective workpieces.

FIG. 8 shows fragmentarily modified construction and arrangement of manifolds 90–93 for the purpose of carrying out the method of the invention for the treatment of generally cylindrical workpieces 95 such, for example, as fence or power poles or marine piling carried by conveyors indicated diagrammatically at 96. As shown, each of the manifolds 90–93 is formed of curved segments, and these segments are preferably provided with adjustable mountings indicated diagrammatically at 97 enabling them to be adjusted with respect to each other and the work to accommodate workpieces of different diameter. Otherwise this form of the invention is essentially the same as already described, and it is especially useful for the treatment of workpieces such as posts which primarily require treatment of only the end portion thereof intended to be placed in the ground. This ability of the invention to provide for treatment of a workpiece is another of its advantages, since each partial treatment cannot be effectively carried out with conventional equipment wherein the entire workpiece must be enclosed in a pressure vessel.

For some purposes, workpieces produced in accordance with the invention may not require the optimum minute dimensions of the holes 20 and may be equally satisfactory if they have similarly produced holes therein which are somewhat longer than they are wide. This is particularly the case, for example, with construction lumber of larger section such as may be used for foundations, joists or studding. An example of such lumber treated in accordance with a form of the invention is shown in FIG. 6 as comprising a length of 2 x 6 plank 100 which differs from the piece 25 in FIG. 5 in that instead of the pattern of circular holes 20, it has a similar pattern of slots 101 of minute width comparable to the diameter of the holes 20 but of somewhat greater length, for example ⅛ inch.

Treated workpieces of the characteristics shown in FIG. 6 may be produced in essentially the same manner and with essentially the same equipment already described in connection with FIGS. 10–14 except that only a single row of nozzles is required extending opposite the short dimension of each surface of the workpiece to be treated, although such nozzles may be relatively staggered in a plurality of rows to obtain the proper effective spacing in the lateral dimension of the work. The pressure supply to these nozzles may be essentially the same as described in connection with FIG. 7, including the alternating control valve 40, but the feed conveyor for the work should be driven continuously and at somewhat slower speed than in the previous example. As the work proceeds at a constant speed past the nozzle manifolds, the latter will be operated to discharge jets periodically, at and for predetermined intervals providing the proper spacing of the slots 88 longitudinally of the work. Otherwise, this form of the invention is essentially the same as those already described, and it will be apparent that this slot treatment may be particularly useful for poles and the like as described in connection with FIG. 8, since with such workpiece, circular holes offer no significant advantage over slotted holes.

The apparatus of the invention as described and shown does not make provision for an impregnating treatment applied to the ends of the workpieces. While it will be apparent that it would be simple to design a manifold for jet treatment of the ends of the workpieces, this would normally not be needed because the end of a wood workpiece is commonly sufficiently absorbent that adequate impregnation can be accomplished by a simple step of dipping each end where treatment is desired.

As previously noted, while impregnation treatments of wood have in the past been commonly limited to treatment with preservatives against destructive forces, it is highly practicable to employ the present invention for treatments combining preservation and decoration. As a specific example of this phase of the invention, it is applicable to the treatment of boards or panels of wood or other porous material such as fiberboard intended for finishing purposes, and in this case this solution applied to these pieces can comprise a priming coat for the paint or other covering agent which will ultimately be applied to the piece. Thus the practice of the invention makes it feasible not only to subject dimension lumber to treatment with preservatives, but to treat it at the mill with a priming coat so that prime coating of the material at he place of ultimate use will be unnecessary.

The importance of the advantage of the invention as applied to priming treatments is easily appreciated by noting the fact that dimension lumber primed in accordance with the invention will be relatively resistant to rain and other moisture sources in a new building and will therefore quickly dry for finish painting as compared with untreated lumber. Additionally, priming in accordance with the invention will result in impregnation of the work as distinguished from an essentially surface coating, thus assuring improved bonding of the finish coats and minimizing the possibilities of air bubbles under the priming coat capable of detracting from the finish coat.

Priming by means of the invention as just described offers special advantages in treatment with substances such as resins which are designed to impart long lasting finish properties to the treated materials. It should also be noted that for this field of use, a relatively low order of penetration will usually be sufficient, and also that minimum size holes provide the optimum finish properties. Accordingly, in this application of the invention, nozzle orifices as small as 0.001 inch and source pressures of 5000 p.s.i. may be satisfactory.

It is to be understood that the term "treating agent" as used herein and in the claims includes any fluid substance which may be introduced into wood or other porous material to impart desired characteristics thereto which did not previously exist in the material, or to improve or extend natural properties of the material. Thus as already noted, the use of the invention in connection with wood encompasses impregnation with preservative chemicals such as creosote and pentachlorophenol, with fire retardatives or water repellants, and also with dimension stabilizing fluids such as polyethylene glycol. Additionally, the invention is especially useful for the treatment of wood with substances capable of imparting increased strength thereto, such particularly as resins like phenol formaldehyde and other formaldehyde compounds. Decorative or related materials such as paint and priming liquids provide additional examples for the use of the invention, and such substances may be applied in accordance with the invention to a wide variety of materials other than wood such, for example, as composition panels for sound proofing or other finishing purposes.

The principles of this invention are also applicable to portable equipment, and this may be most useful for the treatment of wood or other porous material which has already been fabricated into a structure such, for example, as the hull of a boat or any sort of building. For such purposes, the supply system may comprise essentially the same components as described in connection with FIG. 7 but with the pump and reservoir appropriately proportioned for portability. Also the control valve can more readily be of a manually operated type rather than the solenoid operated valve 40, and for practical considerations, the nozzle manifold will include a relatively small number of nozzles, probably from 1 to 10 or more. An example of such manifold is shown diagrammatically as 110 in FIG. 9 as constructed generally like the manifolds 60 and 61 but incorporating only five nozzles 21. For convenience in manual operation, the manifold 110 may be provided with feet 111 proportioned to locate the nozzles in the preferred spacing from the surface of the workpiece to be treated thereby.

While the methods, forms of apparatus and products herein described constitute preferred embodiments of the invention, it is to be understood that the invention is not limited to these precise methods, forms of apparatus and products, and that changes may be made therein without departing from the scope of the invention which is defined in the appended claims.

What is claimed is:

1. The method of impregnating wood and other porous material with a solution of a treating agent which comprises the steps of applying said solution to the surface of a workpiece of said material in the form of a jet of minute cross section at sufficiently high pressure to develop a hole of correspondingly minute width extending into said workpiece, continuing said applying step at substantially the same said pressure for a sufficient interval to extend said hole into said workpiece to at least a predetermined depth and to effect diffusion of said solution into said workpiece laterally from said hole, terminating said applying step after said interval, and carrying out all of said steps at such spaced locations along a predetermined area of the surface of said workpiece that said diffused solution impregnates the entire portion of said workpiece underlying said surface area to substantially said depth.

2. The method according to claim 1 comprising holding said workpiece and said jet relatively stationary during said applying step to develop holes of substantially the same configuration as said jet in said workpiece.

3. The method as defined in claim 1 comprising continuously moving said workpiece laterally with relation to said jet, and carrying out said applying and terminating steps alternately to develop holes in said workpiece of greater length than width.

4. The method as defined in claim 1 wherein each of said successive steps is carried out simultaneously at a plurality of spaced locations on the surface of said workpiece.

5. The method as defined in claim 1 wherein said jet is of the order of .003–.010 inch in diameter, and the source pressure of said jet is of the order of 10,000–50,000 p.s.i.

6. Apparatus for impregnating workpieces of wood and other porous material with a solution of a treating agent, comprising a plurality of jet nozzles arranged in predetermined laterally spaced relation and each having a jet orifice of predetermined minute cross section, means for supplying the solution under high pressure to all of said nozzles for simultaneous discharge from said orifice as jets of correspondingly minute cross section, means for supporting said nozzles in position to direct said jets toward the adjacent surface of the workpiece to be treated, and conveyor means for effecting relative movement of said workpiece and said nozzles to cause each of said jets to impinge on said workpiece at a plurality of spaced locations.

7. Apparatus as defined in claim 6, comprising means for temporarily interrupting the operation of said supply means at predetermined intervals, and means operating in timed relation with said control means to effect said relative movement of said workpiece and said nozzles while the operation of said supply means is interrupted.

8. Apparatus as defined in claim 6 comprising means for temporarily interrupting the operation of said supply means at predetermined intervals, and means for blocking operation of said conveyor means during the operation of said supply means.

9. Apparatus as defined in claim 6 comprising means for operating said conveyor means continuously, and means for temporarily interrupting the operation of said supply means at predetermined intervals.

10. Apparatus as defined in claim 6 comprising manifold means having at least one extension passage therein forming a header and adapted at one end for connection to said supplying means, each of said nozzles being mounted in one side of said manifold means with the inlet end thereof connected with one said header, and a shutoff valve for each of said nozzles supported in said manifold means, said shutoff valves being individually operable to provide for supply of said solution to any selected number of said nozzles less than the total thereof.

11. Apparatus as defined in claim 10 wherein each of said shutoff valves comprises a needle valve threaded into said opposite surface of said manifold means from said nozzles in line with the associated said nozzle for movement across said header into closing relation with the inlet end of the asssociated said nozzle.

12. A piece of wood or other porous material impregnated with a treating agent and characterized by the following features: the surface of said piece having therein a predetermined pattern of minute holes, each of said holes extending below said surface to a substantial depth and comprising a top portion constituting the major portion of said depth and a bottom end portion, said top portion being of generally uniform cross-sectional dimensions over substantially its entire depth, said bottom end portion being of substantially larger cross-sectional dimensions than said top portion, said agent being diffused laterally of each of said holes into the portion of said piece surrounding each said hole, and said holes being in such relative spacing that the portions of said piece into which said agent is diffused from each of said holes overlap sufficiently to effect impregnation of a predetermined portion of said piece underlying said surface.

13. A piece of impregnated wood as defined in claim 12 wherein said holes are substantially more widely spaced in the direction parallel to the grain of said piece than in the direction perpendicular to said grain, and wherein said agent diffused into the wood surrounding each of said holes defines a pattern which is similarly substantially longer in the direction of said grain than in the perpendicular direction.

14. A piece of impregnated wood as defined in claim 12 wherein said agent comprises a preservative chemical for the wood.

15. A piece of impregnated wood as defined in claim 12 wherein said agent comprises a priming agent for an exterior surfacing material.

16. A piece of material as defined in claim 12 wherein the depth of each of said holes is at least twenty times the diameter of the upper end thereof, and each of said holes is substantially uniformly circular in cross section over a substantial portion of the depth thereof but includes a relatively enlarged bottom end portion of generally teardrop shape in longitudinal section.

17. A piece of material as defined in claim 16 wherein the diameter of each of said holes is of the order of .001–.020 inch.

References Cited by the Examiner

UNITED STATES PATENTS

| | | | |
|---|---|---|---|
| 1,602,401 | 10/1926 | Ellicott | 117—58 X |
| 2,928,390 | 3/1960 | Venditty et al. | 128—173 |

MORRIS O. WOLK, *Primary Examiner.*

F. W. BROWN, *Assistant Examiner.*